(12) United States Patent
Kert et al.

(10) Patent No.: US 8,628,421 B2
(45) Date of Patent: Jan. 14, 2014

(54) ELECTRONIC GAMING SYSTEM AND METHOD FOR PROVIDING PUZZLE GAME USING VIDEO FEED

(75) Inventors: Kaido Kert, Tallinn (EE); Erki Esken, Kuusalu (EE)

(73) Assignee: Skype, Dublin (IE)

( * ) Notice: Subject to any disclaimer, the term of this patent is extended or adjusted under 35 U.S.C. 154(b) by 847 days.

(21) Appl. No.: 12/455,880

(22) Filed: Jun. 9, 2009

(65) Prior Publication Data

US 2010/0062858 A1 Mar. 11, 2010

(30) Foreign Application Priority Data

Sep. 9, 2008 (GB) .................................... 0816492.3

(51) Int. Cl.
*A63F 9/00* (2006.01)

(52) U.S. Cl.
USPC .......................................................... 463/42

(58) Field of Classification Search
None
See application file for complete search history.

(56) References Cited

U.S. PATENT DOCUMENTS

| | | | |
|---|---|---|---|
| 4,961,579 A * | 10/1990 | Thompson et al. | 273/153 R |
| 5,296,845 A * | 3/1994 | Haller | 463/9 |
| 5,548,340 A | 8/1996 | Bertram | |
| 5,643,084 A | 7/1997 | Mirsky | |
| 5,944,605 A * | 8/1999 | Pajitnov | 463/9 |
| 6,064,771 A * | 5/2000 | Migdal et al. | 382/232 |
| 6,102,796 A * | 8/2000 | Pajitnov et al. | 463/9 |
| 6,452,515 B1 * | 9/2002 | Duquesnois et al. | 341/50 |
| 7,545,439 B2 * | 6/2009 | Wahlroos | 348/553 |
| 7,878,891 B2 * | 2/2011 | Chiu | 463/9 |
| 2002/0133722 A1 * | 9/2002 | Levanon et al. | 713/201 |
| 2005/0245317 A1 * | 11/2005 | Arthur et al. | 463/42 |
| 2007/0242066 A1 * | 10/2007 | Levy Rosenthal | 345/419 |
| 2007/0268312 A1 * | 11/2007 | Marks et al. | 345/633 |
| 2008/0070697 A1 * | 3/2008 | Robinson et al. | 463/42 |

FOREIGN PATENT DOCUMENTS

| | | |
|---|---|---|
| JP | 2004-129861 | 4/2004 |
| JP | 2007-226297 | 9/2007 |
| WO | WO 00/64183 | 10/2000 |

(Continued)

OTHER PUBLICATIONS

Notification of Transmittal of The International Search Report and The Written Opinion of the International Searching Authority, or the Declaration, International Application No. PCT/EP2009/061490, Date of Mailing, Dec. 17, 2009.

(Continued)

*Primary Examiner* — Seng H Lim
(74) *Attorney, Agent, or Firm* — Wolfe-SBMC (57) ABSTRACT

A games system, method and program. The system comprises: a user control device arranged to be operable by a user; a network interface for receiving data via a packet-based communication network; and a processing apparatus arranged to execute a game application and a communication client; wherein the communication client is programmed to establish video communication via the network interface and packet-based communication network, receive video data from a remote user and decode the video data to produce a live video image; wherein the game application is arranged to divide the live video image into segments, re-order the segments to produce a shuffled live video image and output the shuffled live video image for display on a display unit; and wherein the game application is further arranged to receive control information from the control device and cause a further-reordering of the segments responsive thereto during the video communication.

21 Claims, 4 Drawing Sheets

(56) References Cited

FOREIGN PATENT DOCUMENTS

| WO | WO 02/058806 A1 | 8/2002 |
| WO | WO 2005/009019 A2 | 1/2005 |
| WO | WO 2007/149707 A1 | 12/2007 |

OTHER PUBLICATIONS

Intellectual Property Office, Search Report, Date of Mailing, Jan. 5, 2010.

* cited by examiner

ELECTRONIC GAMING SYSTEM AND METHOD FOR PROVIDING PUZZLE GAME USING VIDEO FEED

RELATED APPLICATION

This application claims priority under 35 U.S.C. §119 or 365 to Great Britain Application No. 0816492.3, filed Sep. 9, 2008. The entire teachings of the above application are incorporated herein by reference.

This invention relates to games systems for playing electronic games with the involvement of a remote user.

Computer games can be played on dedicated games consoles, personal computers, or even on other terminals such as mobile phones or PDAs (personal digital assistants). Although a "dedicated" games console may nowadays perform many of the same functions as a personal computer or other general purpose computing terminal, the console is still distinct in that it will typically be configured with a default mode of operation as a games system. Furthermore, a home games console will also have a television output for outputting the game images to a television set (although a portable games console may have a built in screen).

Computer games have been around for many years, but in more recent years developers have been increasingly realising the potential for games that involve remote users via communication networks such as the Internet, even on games consoles through which such networks had not previously been accessible.

However, there is a problem with such remote game-play in that the degree of interaction of the remote user is limited. Hence the remote user may not feel as involved or "immersed" as if physically present with another player, but on the other hand it may not be possible to meet in person if the players are friends living at distance or such like. Therefore it would be advantageous to increase the degree of interactivity in remote gaming.

According to one aspect of the invention there is provided a games system comprising: a control device arranged to be operable by a user; a network interface for receiving data via a packet-based communication network; and a processing apparatus arranged to execute a game application and a communication client; wherein the communication client is programmed to establish video communication via the network interface and packet-based communication network, receive video data from a remote user and decode the video data to produce a live video image; wherein the game application is arranged to divide the live video image into segments, re-order the segments to produce a shuffled live video image and output the shuffled live video image for display on a display unit; and wherein the game application is further arranged to receive control information from the control device and cause a further re-ordering of the segments responsive thereto during the video communication.

Preferably, each of the segments tessellate with at least one respective adjacent segment.

The game application may be arranged to cause a selected segment to be moved on the display unit in response to commands from the user received in the control information.

The game application may be arranged to notify the user when the further re-ordering of the segments results in the live video image being restored to its state prior to being shuffled.

The game application may be arranged start a timer upon the re-ordering of the live video image and notify the user when the timer has expired.

The game application may be arranged to stop the timer when the further re-ordering of the segments results in the live video image being restored to its state prior to being shuffled.

Preferably, the video communications is bi-directional. The games system may further comprise a video camera, and the communication client may be arranged to receive video data from the video camera and transmit the video data to the remote user via the packet-based communication network.

Preferably, the display unit is a television set.

The communication client may be arranged to establish the video communication via a peer-to-peer connection in the packet-based communication network.

Preferably, the packet-based communication network is the Internet.

According to another aspect of the invention there is provided a method of manipulating video images, comprising: executing a game application and a communication client on a processing apparatus; the communication client establishing video communication via a network interface and packet-based communication network, such that the communication client receives video data from a remote user and decodes the video data to produce a live video image; the game application dividing the live video image into segments, re-ordering the segments to produce a shuffled live video image and outputting the shuffled live video image for display on a display unit; and receiving control information at the game application from a control device operable by a user and further re-ordering the segments responsive thereto during the video communication.

The step of further re-ordering the segments may comprise moving a selected segment on the display unit in response to commands from the user received in the control information.

The method may further comprise the step of the game application notifying the user when the further re-ordering of the segments results in the live video image being restored to its state prior to being shuffled.

The method may further comprise the steps of starting a timer upon the re-ordering of the live video image and notifying the user when the timer has expired.

The method may further comprise the step of stopping the timer when the further re-ordering of the segments results in the live video image being restored to its state prior to being shuffled.

The method may further comprise the steps of the communication client receiving video data from a video camera and transmitting the video data to the remote user via the packet-based communication network.

The step of establishing video communication may comprise establishing the video communication via a peer-to-peer connection in the packet-based communication network.

According to another aspect of the invention there is provided a computer program product comprising program code means which, when executed by a computer implement the steps according to the above method.

For a better understanding of the invention and to show how the same may be put into effect, reference will now be made, by way of example, to the following drawings in which.

The inventors have recognised the potential for combining otherwise diverse techniques together with a computer game to improve the degree of interaction of a remote user: that is, firstly to incorporate a video communication client into a games system to allow the user to establish a video call via a packet-based communications network, and secondly to utilise this video call within the game-play itself.

Packet-based communication systems allow the user of a terminal to communicate across a computer network such as the Internet. Packet-based communication systems include voice over internet protocol ("VoIP") or video-over-IP communication systems. These systems are beneficial to the user as they are often of significantly lower cost than fixed line or mobile networks. This may particularly be the case for long-distance communication. To use a VoIP or video-over-IP system, the user must execute client software on their device. The client software provides the voice and video IP connections as well as other functions such as registration and authentication. In addition to voice and video communication, the client may also provide further features such as instant messaging ("IM" or "chat" messaging), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their terminal, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A communication client is embedded into a games system so as to enable a user to make live, packet-based video calls from the games system. The client application is in the form of software stored in a memory and arranged for execution on a central processing unit (CPU), the memory and CPU being parts of the games system integrated together into a single household appliance, and hence sold together as a single product, in a single casing optionally with external peripherals such as game controllers. The game system product is preferably a "dedicated" or specialised games console, meaning at least that it has a default mode of operation as a games system.

Figure 1:
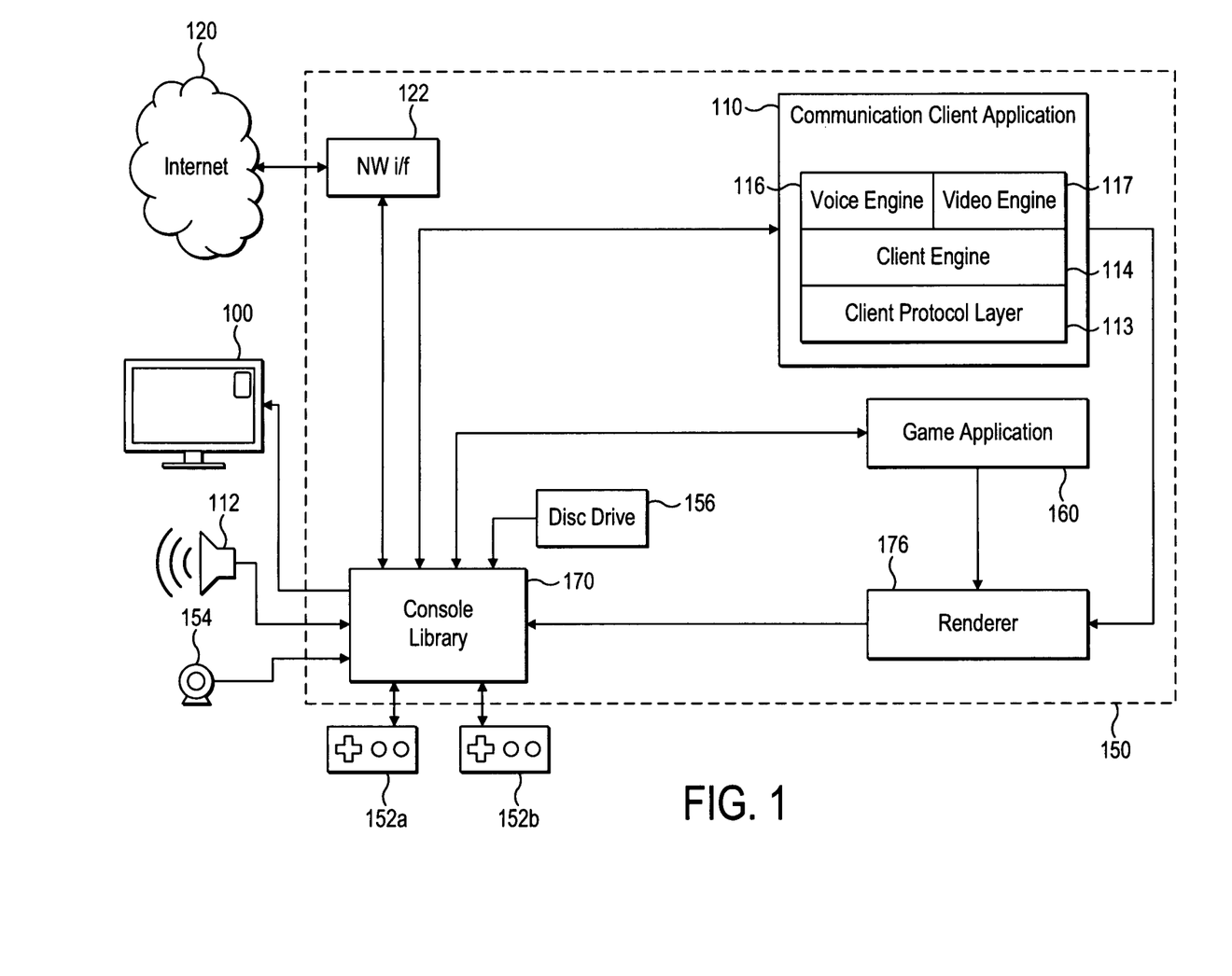
FIG. 1 shows a schematic block diagram of an electronic gaming system.

Reference is now made to FIG. 1, which is a schematic block diagram showing functional blocks of a games system 150 and connected peripherals. The games system 150 comprises a network interface 122 for connecting to the Internet 120. This network interface could be a built-in modem, or a wired or wireless interface connected to an external modem. The games console also comprises a storage reader, preferably a storage module reader with storage module receptacle for receiving and reading removable storage modules. The storage module reader is preferably in the form of a disc drive 156 for reading CDs, DVDs and/or other types of optical disc received via an appropriate slot or tray.

The game system 150 further comprises a console library 170, a game application 160, and a communication client application 110. Each of these blocks are preferably software elements stored on a memory and arranged to be executed on a processing apparatus of the games system 150. The processing apparatus (not shown) comprises at least one central processing unit (CPUs), and may comprise more than one CPU for example in an arrangement of a host CPU and one or more dedicated digital signal processors (DSPs) or a multi-core arrangement. The memory (also not shown) may be of a number of different types and the above software elements may be stored in the same memory or in different memories of the same or different types. For example, the communication client 110 may be installed on an internal hard-drive or flash memory of the games system 150, and the game application 160 may be stored on an optical disc and loaded via the disc drive 156 for execution. Alternatively, the game application could be copied from the optical disc onto the hard drive or flash memory of the game system 150, or downloaded from a server via the network interface 122 and Internet 120. In other embodiments, the client application 110 and/or game application 160 could be stored on an external hard drive or flash memory.

Given the different possible types of memory, note therefore that the game system's storage readers need not necessarily include only a storage module reader such as an optical disc drive, but could also include the reading mechanism of a hard drive, the read circuitry of a flash memory, or suitable software for accessing a server via the network interface 122.

The console library 170 is a basic system library which takes care of low level functions including input and output functions. The console library 170 is preferably stored on a memory internal to the games system 150, e.g. on a hard drive, flash memory or read-only memory (ROM).

The console library 170 is operatively coupled to the screen of a television set 100 via a television output port (not shown) of the games system 150. The console library is also operatively coupled to a loudspeaker 112, which although shown separately can be housed within the television set 100 and coupled to the console library 170 via the television output port. Alternatively another audio output source could be used such as headphones or a connection to a separate stereo or surround-sound system.

In order to receive user inputs from a local user of the games system 150, the console library 170 is operatively coupled to one or more game controllers 152 via one or more respective controller input ports (not shown) of the games system 150. These could comprise a more traditional arrangement of user controls such as a directional control pad or stick with accompanying buttons, and/or other types of user inputs such as one or more accelerometers and/or light sensors such that physical movement of the controller 152 provides an input from the user. The console library 170 can also be arranged to be able to receive audio inputs from a microphone in the controller 152 (or connected thereto) and provide outputs to a speaker housed in the controller 152, again via the controller port. Alternatively, a separate microphone input could be provided.

In order to receive video data from the local user of the games system 150, the console library 170 is operatively coupled to a digital video camera 154, either a webcam or digital camera with video capability, via a camera input port or general purpose input port (not shown).

In order to load game applications or other software, the console library 170 is operatively coupled to the disc drive 156.

Further, the console library 170 is operatively coupled to the network interface 122 so that it can send and receive data via the Internet 120 or other packet-based network.

The console library 170 is operatively coupled to the game application 160, thus enabling inputs and outputs to be communicated between the game application 160 and the various I/O devices such as the TV set 100, loudspeaker 112, controllers 152, video camera 154, disc drive 156 and network interface 122. The console library 170 is also operatively coupled to the client application 110, thus enabling inputs and outputs to be communicated between the client application 110 and the I/O devices such as the TV set 100, loudspeaker 112, controllers 152, video camera 154, disc drive 156 and network interface 122.

The communication client 110 and game application 160 are connected to a renderer 176. The renderer 176 is responsible for rendering graphics for display on the TV set 100. In particular, the renderer 176 combines the video images input from the communication client 110 and manipulates these in accordance with instructions from the game application 160, as described in more detail hereinafter. The output of the renderer 176 is provided to the console library 170, such that the rendered graphics are sent for display on the TV set 100.

The packet-based communication client 110 embedded in the games system 150 is based around four main elements. Preferably, these four elements are software elements that are stored in memory and executed on a CPU both embedded in the TV 150. The four elements are: a client protocol layer 113, a client engine 114, a voice engine 116, and a video engine 117.

The client engine 114, voice engine 116 and video engine 117 establish and conduct bidirectional, packet-based, point-to-point (including the possibility of point-to-multipoint) communications via a packet based communication network such as the Internet 120; e.g. by establishing a peer-to-peer (P2P) connection over a peer-to-peer network implemented over the Internet 120.

The protocol layer 113 deals with the underlying protocols required for communication over Internet 120.

The client engine 114 is responsible for setting up connections to the packet-based communication system. The client engine 114 performs call set-up, authentication, encryption and connection management, as well as other functions relating to the packet-based communication system such as firewall traversal, presence state updating, and contact list management.

The voice engine 116 is responsible for encoding of voice signals input to the games system 150 as VoIP packet for transmission over the Internet 120 and the decoding of VoIP packets received from the Internet 120 for presentation as audio information to the user of the TV 150. The voice signals may be provided by the local user from a microphone in the controller 152 or separate microphone via the console library 170. The audio output may be output to the loudspeaker 170 via the console library 170.

The video engine 117 is responsible for the encoding of video signals input to the games system 150 as packets for transmission over the internet 120 in a video call, and the decoding of video packets received in a video call for presentation as video images to the TV set 100. The input video signals may be provided by the local user from the video camera 154 via the console library 170. The output video may be output to the TV set 100 via the renderer 176 and the console library 170.

The game application 160 comprises game logic responsible for receiving inputs from users and processing those inputs according to the rules of the game. Specifically, the game application 160 is programmed to manipulate a live video image received as part of a video call, and allow the user to control the manipulated image in accordance with game rules.

Figure 2:
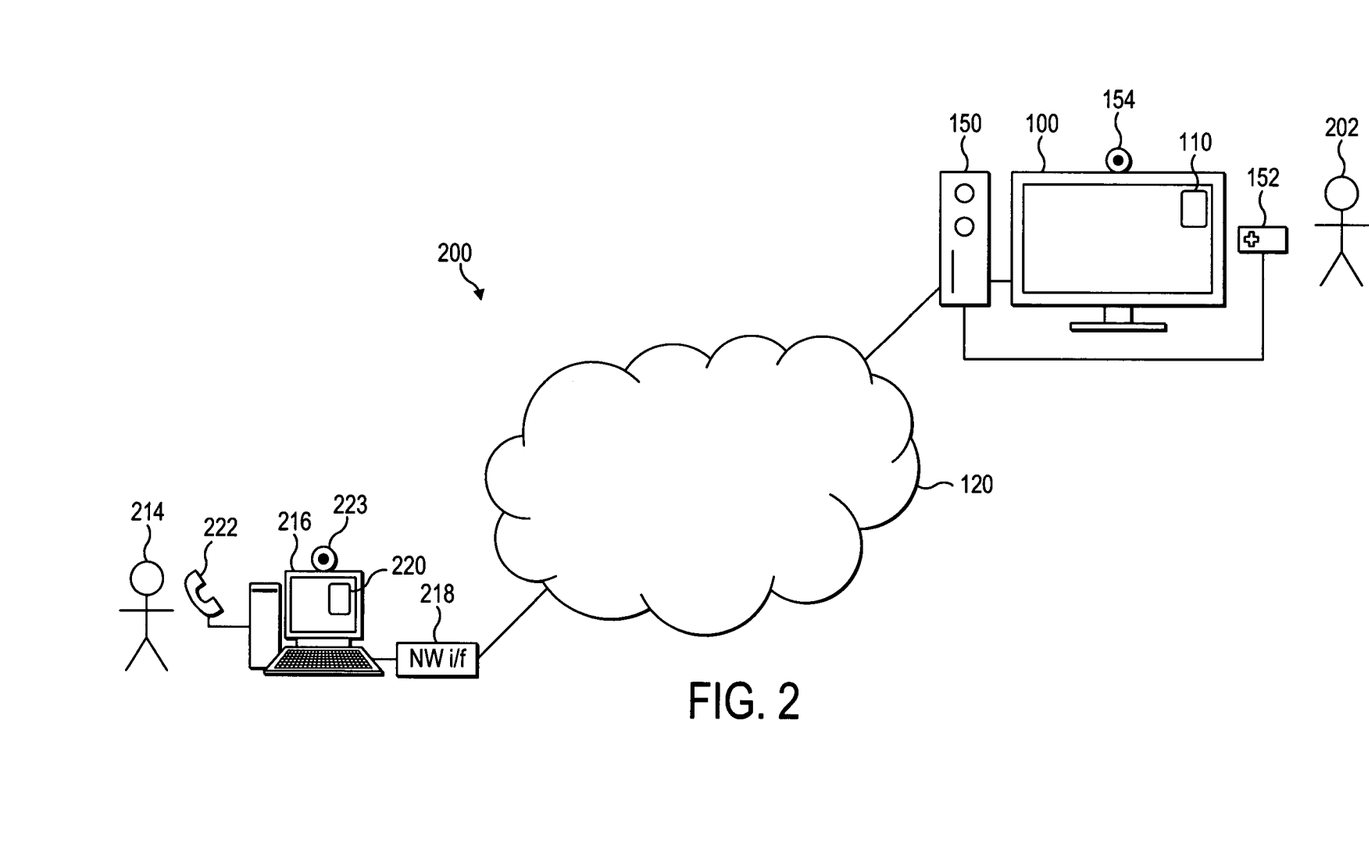
FIG. 2 shows a schematic diagram of a communication system.

In order to describe the operation of the games system 150 with the packet-based communication system, and particularly the operation of the game application 160 with the communication client 110, reference is now made to FIG. 2, which illustrates the use of the games system 150 in a portion of an example system 200.

Note that whilst the illustrative embodiment shown in FIG. 4 is described with reference to a P2P communication system, other types of non-P2P communication system could also be used. The system 200 shown in FIG. 4 shows a first user 202 of the communication system operating a TV 100, which is shown connected to a games system 150, which is in turn connected to a network 120. Note that the communication system 200 utilises a network such as the Internet. The games system 150 is connected to the network 120 via a network interface (not shown) such as a modem, and the connection between the games system 150 and the network interface may be via a cable (wired) connection or a wireless connection.

The games system 150 is executing an embedded communication client 110. The games system 150 is arranged to receive information from and output information to the user 202. A controller 152 acts as the input device operated by the user 202 for the control of the games system 150.

The embedded communication client 110 is arranged to establish and manage voice and video calls made over the packet-based communication system using the network 120. The embedded communication client 110 is also arranged to present information to the user 202 on the screen of the TV 100 in the form of a user interface. The user interface comprises a list of contacts associated with the user 202. Each contact in the contact list has a user-defined presence status associated with it, and each of these contacts have authorised the user 202 of the client 110 to view their contact details and user-defined presence state.

The contact list for the users of the packet-based communication system is stored in a contact server (not shown in FIG. 4). When the client 110 first logs into the communication system the contact server is contacted, and the contact list is downloaded to the client 110. This allows the user to log into the communication system from any terminal and still access the same contact list. The contact server is also used to store a mood message (a short user-defined text-based status that is shared with all users in the contact list) and a picture selected to represent the user (known as an avatar). This information can be downloaded to the client 110, and allows this information to be consistent for the user when logging on from different terminals. The client 110 also periodically communicates with the contact server in order to obtain any changes to the information on the contacts in the contact list, or to update the stored contact list with any new contacts that have been added.

Also connected to the network 120 is a second user 214. In the illustrative example shown in FIG. 4, the user 214 is operating a user terminal 216 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 216 comprises a display such as a screen and an input device such as a keyboard, mouse, joystick and/or touch-screen. The user device 216 is connected to the network 120 via a network interface 218 such as a modem.

Note that in alternative embodiments, the user terminal 216 can connect to the communication network 120 via additional intermediate networks not shown in FIG. 4. For example, if the user terminal 216 is a mobile device, then it can connect to the communication network 120 via a mobile network (for example a GSM or UMTS network).

The user terminal 216 is running a communication client 220, provided by the software provider. The communication client 220 is a software program executed on a local processor in the user terminal 216 comprising similar elements to the embedded communication client 110. The communication client 220 enables the user terminal 216 to connect to the packet-based communication system. The user terminal 216 is also connected to a handset 222, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 216, or integrated into the user terminal 216 itself. The user terminal 216 is also connected to a video camera 223, such as a webcam, which enables video images from the user terminal 216 to be sent in a video call.

Presuming that the first user 202 is listed in the contact list of the client 220 presented to second user 214, then the second user 214 can initiate a video call to the first user 202 over the communication network 120. Similarly, the first user 202 can initiate a video call to the second user 214 over the communication network 120. This video call can be incorporated into a game at the games system 150.

The video call set-up is performed using proprietary protocols, and the route over the network 120 between the calling user and called user is determined by the peer-to-peer system without the use of servers. Following authentication through the presentation of digital certificates (to prove that the users are genuine subscribers of the communication system—described in more detail in WO 2005/009019), the call can be established.

The user 202 can select to answer an incoming video call by pressing a key on the controller 152. When the video call is established with the second user 214, voice and video packets from the user terminal 216 begin to be received at the communication client 110.

In the case of video packets, video images are captured by the video camera 223, and the client 220 executed on user terminal 216 encodes the video signals into video packets and transmits them across the network 120 to the games system 150. The video packets are received at the console library 170 (in FIG. 1) and provided to the client protocol layer 113. The packets are processed by the client engine 114 and video data is passed to the video engine 117. The video engine 117 decodes the video data to produce live video images from the video camera 223 at the remote user terminal 216.

The video images are called "live" in the sense that they reflect the real-time input to the remote video camera 223. However, it will be understood that transmission and processing delays in both clients 220 and 110, and over the network 120 will result in the video images at the games system 150 being displayed at the TV 100 with a time-delay relative to when the images are input to the remote video camera 223.

In parallel with the processing of video packets, voice packets are also handled to provide the audio component of the video call. In the case of voice packets, when the second user 214 talks into handset 222, the client 220 executed on user terminal 216 encodes the audio signals into VoIP packets and transmits them across the network 120 to the games system 150. The VoIP packets are received at the client protocol layer 113 (via the console library), provided to the client engine 114 and passed to the voice engine 116. The voice engine 116 decodes the VoIP packets to produce audio information. The audio information is passed to the console library 170 for output via the speaker 112.

The live video images decoded by the video engine 117 are provided to the renderer 176. If the game application 160 is not being used, then the live video images received during the video call are passed to the console library 170 and displayed to the user 202 on the TV 100.

However, the user 202 is also able to utilise the games system 150, and specifically the game application 160 to play a game comprising the live video images being received from the second user 214, whilst the video call is ongoing.

Figure 3:
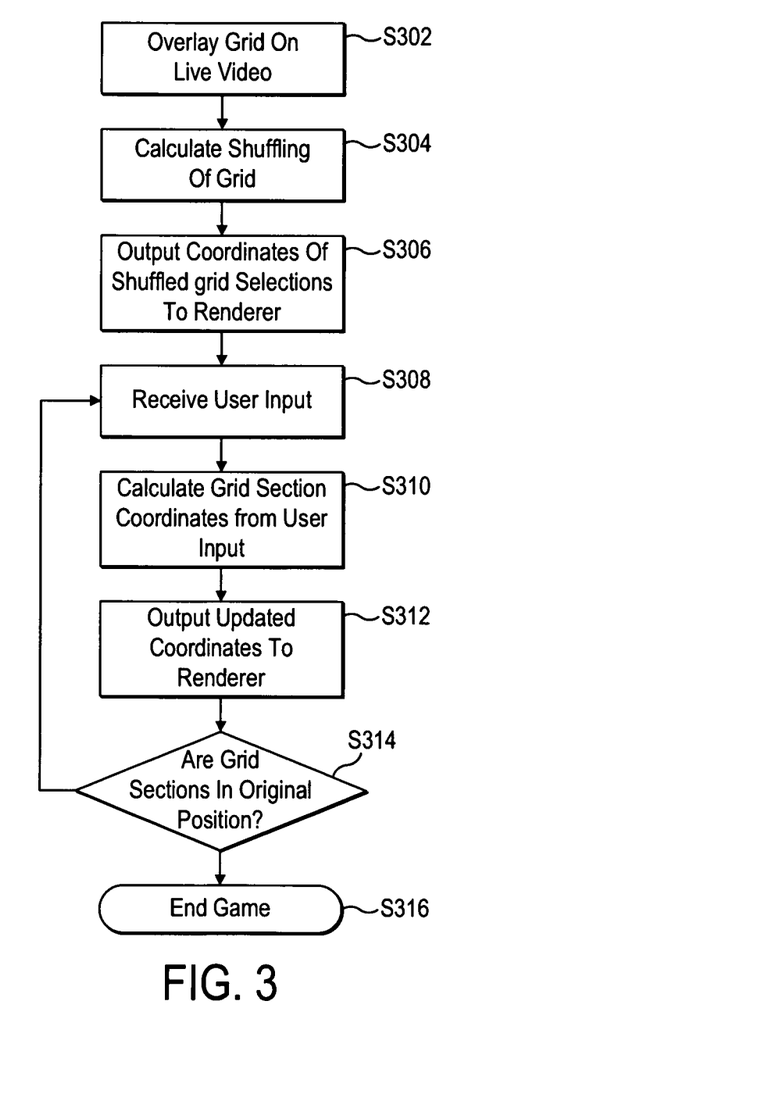
FIG. 3 shows a flowchart of a process for playing a game comprising a live video image.

A process performed at the game application 160 for playing the game comprising the live video images is described with reference to the flowchart shown in FIG. 3.

In step S302, the game application 160 creates a grid that is used to divide up the live video image. This is performed by the game application calculating the shape and configuration of the grid and providing this information to the renderer 176. The renderer 176 generates the grid and uses it to split up or divide the live video image into a plurality of sections. Therefore each section, or segment, comprises a portion of the live video image. The renderer 176 outputs the video image showing the sections that have been created, such that it is displayed on the TV 100.

Figure 4A:
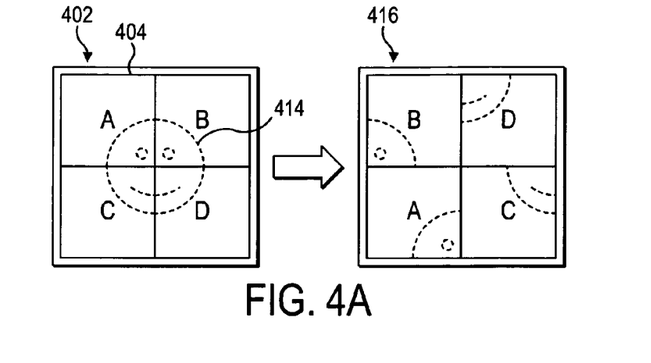
FIG. 4A-4C shows example segmentations of a video image.
Figure 4B:
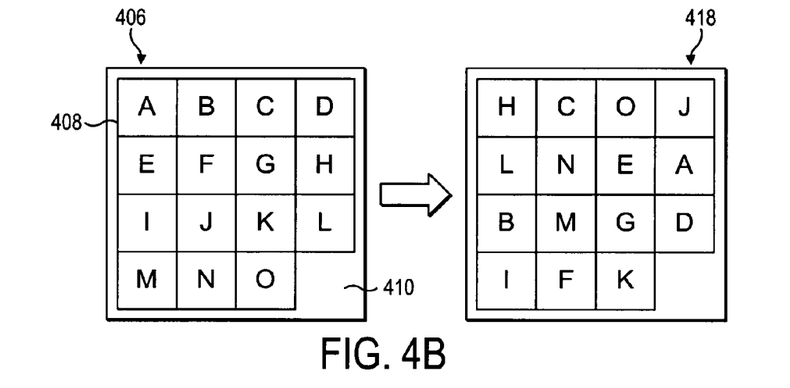
Figure 4C:
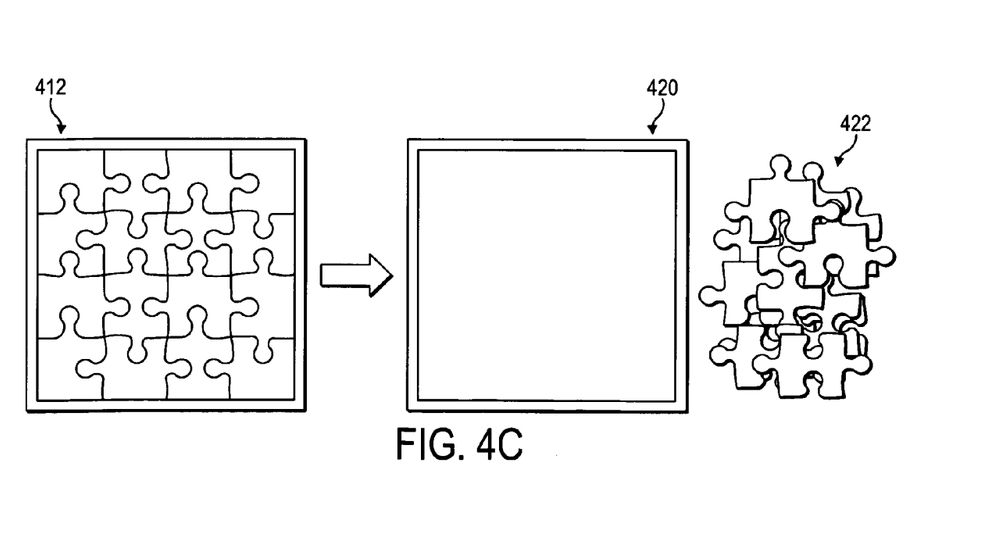

Examples of grids that can be used to divide up a live video image are shown in FIGS. 4A to 4C. In FIG. 4A, a simple 2×2 grid 402 is used to divide up the video image, thereby forming four grid sections, or segments, 404A-404D. In FIG. 4B, a 4×4 grid 406 is used to divide up the live video image, and the video image is divided into 15 segments 408A-408O (note that a segment 410 is removed, for reasons outlined below). In FIG. 4C, the video image divided up with tessellating shapes 412 resembling a jigsaw puzzle.

The grid used to divide up the video image can comprise any shapes or combination of shapes (regular or otherwise), such that the video image is divided into a plurality of segments. The shape and configuration of the grid generated by the game application 160 can be in the form of coordinates for the position of each of the segments and the shape of each segment.

In step S304, the game application 160 executes a grid shuffling algorithm. The grid shuffling algorithm is arranged to determine new coordinates for each of the segments, such that when moved to these new coordinates the segments are re-ordered; that is, shuffled.

In step S306, the game application 160 outputs the coordinates of the shuffled segments to the renderer 176. In response to receiving the coordinates of the shuffled segments, the renderer 176 moves each segment of the live video image to its new coordinate. The renderer 176 outputs the video image comprising the re-ordered segments for display on the TV 100.

It is important to appreciate that this operation is performed whilst the video call is ongoing and the live video images are being updated in real-time. Therefore, when the segments are re-ordered, the overall content of the live video image is still being displayed, but each portion of the video image shown in each segment is dislocated relative to where it would normally be seen.

This can be seen illustrated in FIG. 4A. After the shuffling operation, the grid 402 has each of the four segments located in a different place relative to their original location. For example, segment 404A is located where segment 404B was originally. In addition, the portion of the live video image in each segment is also moved with the segments. If the original (pre-shuffled) live video image (received at the communication client 110 from the video camera 223) shows the face 414 shown with dashed lines, then after the segments are shuffled the live video image is re-ordered as shown in the re-ordered grid 416. For example, the right eye of the face 414 was originally located in segment 404B, and after re-ordering is located in the top-left of the grid. The portions of the video image displayed in the segments are still being updated in real-time with the video call data from the remote party 214, but are now dislocated.

Alternative shuffling operations are illustrated in FIGS. 4B and 4C. In FIG. 4B, the missing segment 410 is used to enable an adjacent segment to be moved either vertically or horizontally into the place of the missing segment 410. This process can be repeated until the grid is sufficiently re-ordered, as in shuffled grid 418. The live video image from the video call is still displayed in real-time as each segment displays its respective portion of the video image, but the video image re-ordered in accordance with the new positions of each segment.

In FIG. 4C, after re-ordering, each of the segments resembling a jigsaw puzzle piece have been removed from the grid 412, shuffled, and placed at the side of the (now empty) grid 420. The live video image from the video call is still displayed in real-time, as each segment displays its respective portion of the video image whilst placed in a segment pile 422.

Preferably, the renderer 176 is arranged to animate the shuffling operating, so that the user 202 can clearly see what is happening on the TV 100.

The goal of the game is for the user to re-order the shuffled live video image such that the segments are each returned to their original positions, whilst the video call is ongoing. In additional embodiments, a timer can also be provided, and the user must complete the game by restoring the live video image before the expiry of the timer, or otherwise the game is terminated and the user notified.

The game application is arranged to enable the user 202 to move the shuffled segments displayed on the screen to another location on the grid using the controller 152. The inputs from the controller 152 are passed to the console library 170, interpreted and passed to the game application 160 in step S308. In step S310 the game application 160 calculates the new coordinates of a segment in response to the user input, and outputs the new coordinates to the renderer 176 in step S312. The renderer 176 then causes the selected segment to move to the location selected by the user on the display. This can happen in real-time, such that the user is able to drag a segment from one location to another. Preferably, the renderer 176 is arranged to animate moving of the segments by the user, so that the user can clearly see what is happening on the TV 100.

In step S314 it is determined whether the segments have been restored to their original coordinates (i.e. are back where they were prior to shuffling). If not, then the game application continues to receive user input. If each of the segments of the live video image has been returned to its original location, then game ends in step S316. The game application 160 is arranged to notify the user when they have completed the game.

Referring to FIG. 4A, the user 202 can drag a selected segment to the location in the grid of an underlying segment, which causes the selected segment and the underlying segment to swap positions. This process can be repeated until the segments are returned to their original locations.

In FIG. 4B, the user can drag a segment adjacent to the space of the missing segment 410 into the space, thereby leaving a space behind where the selected segment was previously located. This process can be repeated until the segments are returned to their original locations.

In FIG. 4C, the user can select a segment and drag it to a chosen position on the grid, then repeat this whilst interlocking the segments together until the video image is restored.

Therefore, the above-described system enables a user to engage in a game that is combined with a real-time, live video stream from another user. The actual live video images from the other user are part of the game itself, thereby making the game much more immersive and interactive.

It will be understood that many other similar types of shape manipulation or re-ordering games can also be incorporated into this system, in addition to those described with reference to FIG. 4A to 4C.

The games system 150 can also utilise the video camera 154 to send video images to the second user 214, in a similar manner to that described above. This enables the second user 214 to see the first user 204 during the game. In addition, the shuffled video image can also be sent back to the second user 214, so that they may see themselves in the shuffled state, and also view the progress of the user 202 in restoring the live video image to its original form.

In further embodiments, the first user 202 and second user 214 can each receive a live video image from the other, and both the users can play the same game of re-ordering their live video images as a race, such that the user that restores the live video stream of the other party first wins the game. In other words, in this embodiment, the first user 202 tries to restore the order of a shuffled video stream sent from the second user 214, whilst, at the same time, the second user 214 tries to restore the order of a shuffled video stream sent from the first user 202.

While this invention has been particularly shown and described with reference to preferred embodiments, it will be understood to those skilled in the art that various changes in form and detail may be made without departing from the scope of the invention as defined by the appendant claims. For example, the above-described game could also be played on a personal computer, using a pointing device such as a mouse, or on a mobile device such as mobile phone, laptop, or ultra mobile personal computer ("UMPC").

The invention claimed is:

1. A games system comprising:
    a control device arranged to be operable by a user;
    a network interface for receiving data via a packet-based communication network, wherein the packet-based communication system is configured to provide voice over internet protocol (VoIP) two-way communication between the user and a remote user; and
    a processing apparatus arranged to execute a game application and a communication client;
    wherein the communication client is programmed to establish video communication via the network interface and packet-based communication network, receive video data from the remote user and decode the video data to produce a live video image;

wherein the game application is arranged to divide the live video image into segments, re-order the segments to produce a shuffled live video image and output the shuffled live video image for display on a display on a display unit, the segments of the live video image being continuously updated in real time while the video communication is ongoing between the user and the remote user and a live video stream being continuously received from the remote user; and wherein the game application is further arranged to receive control information from the control device and cause a further re-ordering of the segments responsive thereto during the video communication.

2. A games system according to claim 1, wherein each of the segments tessellate with at least one respective adjacent segment.

3. A games system according to claim 1, wherein the game application is arranged to cause a selected segment to be moved on the display unit in response to commands from the user received in the control information.

4. A games system according to claim 1, wherein the game application is arranged to notify the user when the further re-ordering of the segments results in the live video image being restored to its state prior to being shuffled.

5. A games system according to claim 1, wherein the game application is arranged start a timer upon the re-ordering of the live video image and notify the user when the timer has expired.

6. A games system according to claim 5, wherein the game application is arranged to stop the timer when the further re-ordering of the segments results in the live video image being restored to its state prior to being shuffled.

7. A games system according to claim 1, wherein the video communications is bi-directional.

8. A games system according to claim 7, further comprising a video camera, and wherein the communication client is arranged to receive video data from the video camera and transmit the video data to the remote user via the packet-based communication network.

9. A games system according to claim 1, wherein the display unit is a television set.

10. A games system according to claim 1, wherein the communication client is arranged to establish the video communication via a peer-to-peer connection in the packet-based communication network.

11. A game system according to claim 1, wherein the packet-based communication network is the Internet.

12. A method of manipulating video images, comprising:
executing a game application and a communication client on a processing apparatus;
the communication client establishing video communication via a network interface and packet-based communication network, such that the communication client receives video data from a remote user and decodes the video data to produce a live video image, wherein the packet-based communication system is configured to provide voice over internet protocol (VoIP) two-way communication between the user and the remote user;
the game application dividing the live video image into segments, re-ordering the segments to produce a shuffled live video image and outputting the shuffled live video image for display on a display unit, the segments of the live video image being continuously updated in real time while the video communication is ongoing between the user and the remote user and a live video stream being continuously received from the remote user; and
receiving control information at the game application from a control device operable by a user and further re-ordering the segments responsive thereto during the video communication.

13. A method according to claim 12, wherein each of the segments tessellate with at least one respective adjacent segment.

14. A method according to claim 12, wherein the step of further re-ordering the segments comprises moving a selected segment on the display unit in response to commands from the user received in the control information.

15. A method according to claim 12, further comprising the step of the game application notifying the user when the further re-ordering of the segments results in the live video image being restored to its state prior to being shuffled.

16. A method according to claim 12, further comprising the steps of starting a timer upon the re-ordering of the live video image and notifying the user when the timer has expired.

17. A method according to claim 16, further comprising the step of stopping the timer when the further re-ordering of the segments results in the live video image being restored to its state prior to being shuffled.

18. A method according to claim 12, wherein the video communications is bi-directional.

19. A method according to claim 18, further comprising the steps of the communication client receiving video data from a video camera and transmitting the video data to the remote user via the packet-based communication network.

20. A method according to claim 12, wherein the step of establishing video communication comprises establishing the video communication via a peer-to-peer connection in the packet-based communication network.

21. A non-transitory computer program product comprising program code means which, when executed by a computer implement the steps of:
executing a game application and a communication client on a processing apparatus;
the communication client establishing video communication via a network interface and packet-based communication network, such that the communication client receives video data from a remote user and decodes the video data to produce a live video image, wherein the packet-based communication system is configured to provide voice over internet protocol (VoIP) two-way communication between the user and the remote user;
the game application dividing the live video image into segments, re-ordering the segments to produce a shuffled live video image and outputting the shuffled live video image for display on a display unit, the segments of the live video image being continuously updated in real time while the video communication is ongoing between the user and the remote user and a live video stream being continuously received from the remote user; and
receiving control information at the game application from a control device operable by a user and further re-ordering the segments responsive thereto during the video communication.

* * * * *